Feb. 1, 1966 D. L. FAVIN 3,233,124

IMPULSE COUNTER EMPLOYING BLOCKING OSCILLATOR-TRANSISTOR COMBINATION, AND TIMING CIRCUIT FOR PREVENTING FALSE OUTPUTS

Filed April 1, 1963 2 Sheets-Sheet 1

INVENTOR
D. L. FAVIN
BY Patrick J. Roche
ATTORNEY

Feb. 1, 1966 D. L. FAVIN 3,233,124

IMPULSE COUNTER EMPLOYING BLOCKING OSCILLATOR-TRANSISTOR COMBINATION, AND TIMING CIRCUIT FOR PREVENTING FALSE OUTPUTS

Filed April 1, 1963 2 Sheets-Sheet 2

3,233,124
Patented Feb. 1, 1966

3,233,124

IMPULSE COUNTER EMPLOYING BLOCKING OSCILLATOR-TRANSISTOR COMBINATION, AND TIMING CIRCUIT FOR PREVENTING FALSE OUTPUTS

David L. Favin, Whippany, N.J., assignor to Bell Telephone Laboratories, Incorporated, New York, N.Y., a corporation of New York Filed Apr. 1, 1963, Ser. No. 269,502
6 Claims. (Cl. 307—88.5)

This invention relates to a noise impulse voltage counter, and more specifically to such counter for indicating the number of impulse noise peaks having at least a preselected magnitude and rapidly occurring within a predetermined time interval on a voice transmission facility without jamming the counter. The invention includes a pulse generator comprising a monostable blocking oscillator used as an input stage of a two-stage monostable trigger circuit to translate each of said noise peak voltages into a corresponding voltage pulse for activating the counter.

In assigning voice frequency transmission circuits to use with voice-band data transmission facilities in signaling transmission systems, it is essential to know the suitability of the circuit for that purpose. As the demand for such facilities may be of the order of several hundred at a given time or several thousands over a relatively short period of time, it is imperative that the suitability, or the unsuitability, of the circuits should be determined from time to time with a minimum use of technical personnel. Such suitability should be available in the light of the bandwidth of the receiving data facilities with which the test circuits are to be utilized, the environment in which the data facilities are located, and the availability of the technical personnel for the purpose of supervising the testing operations involved.

Apparatus has been heretofore known to count automatically impulse noise peaks of at least a preselected magnitude over a predetermined period of time for evaluating the suitability of voice band circuits for use with voice frequency data facilities. It has been found that such apparatus, when including mechanically counting devices, tends to jam when the noise impulse peaks occur in rapid succession because mechanical inertia precludes the mechanical counter from operating and resetting in the short time periods intervening between rapidly occurring noise impulses.

The present invention contemplates the use of an improved apparatus for counting rapidly occurring impulse noise peak voltages without jamming.

It is a principal object of the invention to provide apparatus for counting impulse noise peak voltages on an automatic basis without jamming.

It is another object to count impulse noise peak voltages with jam-proof apparatus which is light in weight and small in bulk whereby it is rendered expeditiously portable.

It is still another object to provide jam-proof apparatus for counting impulse noise peak voltages in an environment of variable temperature and humidity.

It is a further object to provide jam-proof apparatus for counting impulse noise peak voltages in accordance with a procedure requiring minimum technical skill.

It is still a further object to count impulse noise peak voltages in a predetermined frequency range with jam-proof apparatus.

It is still another object to provide an improved pulse generating circuit.

In association with a source of noise peak voltages and a message register to count such voltages, the present invention for controlling the operation of the message register in response to the respective noise voltages, comprises a pulse generator including a trigger circuit having a blocking oscillator as the input stage and a transistor as the output stage, and means for normally biasing the blocking oscillator to nonconduction and the transistor to conduction so that each noise peak voltage activates the oscillator into conduction for supplying a voltage pulse to turn off the transistor whereby the latter is caused to supply a further voltage pulse to operate the message register, the message register requiring a finite time to operate and reset in response to each noise peak voltage but tending to jam in response to other noise peak voltages occurring within such finite time.

Timing means included in the connecting means disconnects effectively the blocking oscillator from the transistor and thereby from the message register for a predetermined time interval substantially equal to the finite operational time of the message register. This precludes the message register from tending to count additional noise peak voltages within such finite operational time thereby tending to prevent the message register from jamming during the finite operational time.

The timing circuit comprises a diode and a capacitor connected in series between the blocking oscillator output and the transistor input, with the diode poled for conduction in the direction toward the blocking oscillator. In the quiescent state, or in the absence of any noise pulses to the input of the blocking oscillator, the blocking oscillator is turned off, the transistor is turned on and the capacitor is charged through the conducting transistor in such sense that its plate connected to the conducting transistor has an effective negative voltage while its plate connnected to the anode of the diode has an effective positive voltage. At this time the voltages effective on the cathode and anode of the diode serve to bias it slightly below its threshold of conduction. When a positive-going pulse of sufficient magnitude is applied to the input of the blocking oscillator, the latter is activated to conduction for supplying from its output a negative voltage via the series diode and capacitor to the input of the transistor. This negative pulse turns off the transistor which is thereby caused to supply a voltage to operate the message register for counting the one noise voltage pulse applied to the blocking oscillator input.

Now, the capacitor is discharged through the conducting blocking oscillator and thereafter is charged in a different sense in that its plate connected to the nonconductive transistor has an effective positive voltage and its plate connected to the anode of the diode has an effective negative voltage. The polarities of the voltages provided on the respective plates of the capacitor are thus reversed from what they were when the capacitor was charged through the conducting transistor. As the voltage being placed on the capacitor is now increasing in an exponential manner, this voltage as applied to the transistor is also increasing in a corresponding manner until it has sufficient magnitude to turn on the transistor again when the blocking oscillator is turned off. At this time the voltages applied to the cathode and anode of the diode serve to bias the diode slightly below its threshold of conductivity. During this time the effective negative voltage charge on the capacitor plate connected to the diode biases the latter in the reverse direction. This diode is thereby held non-conductive to any successive voltage pulses present in the blocking oscillator output for a predetermined time interval substantially equal to the finite operational time of the message register. This precludes further peak voltages originating in the noise source from turning off the transistor for providing a voltage pulse to operate the message register during the latter's finite operational time. This precludes any jamming of the message register when input noise impulses of relatively large peaks occur in relatively rapid succession during the finite operational time of the message register.

A feature of the invention is the establishment of a "dead time" interval to compensate for the mechanical inertia of the message register. This involves the provision of a time interval within which the message register is permitted to reset itself after counting a noise impulse peak voltage before it is presented again to accept a subsequent noise impulse peak voltage for count.

Another feature of the invention involves a pulse generator or monostable flip-flop including a blocking oscillator as an input stage and a transistor as an output stage. The blocking oscillator is normally biased to nonconduction and the transistor to conduction. An input noise impulse activates the blocking oscillator into conduction for providing an output voltage to turn off the transistor. In going from ON to the OFF state, the transistor produces a voltage which serves to operate the message register. Upon the termination of the noise impulse, the blocking oscillator is automatically returned to nonconduction and the transistor to conduction.

These and other objects of the invention are readily understood from the following description taken together with the accompanying drawing in which.

Figure 1:
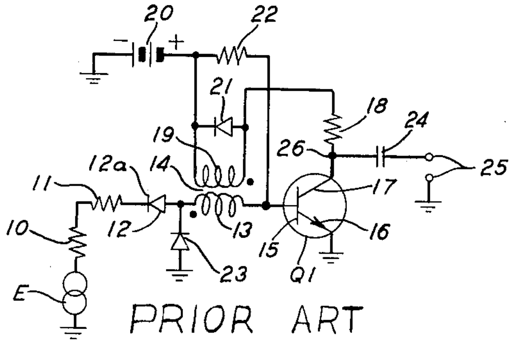
FIG. 1 is a schematic circuit illustrating one type of a prior-art blocking oscillator.

FIG. 1 discloses a type of blocking oscillator familiar to the art. It includes essentially a source E providing noise peaks of alternating voltage having one terminal grounded and an opposite terminal connected in a series circuit including resistors 10 and 11, a diode 12 poled for conduction in a direction toward the source E, a primary winding 13 of a transformer 14 and base 15 of transistor Q1. The source E may be construed to represent a voice frequency data transmission circuit under test and to involve one or more noise voice-frequency bands which are related to data processing equipment connected to a data transmission circuit, as disclosed in T. C. Anderson—D. L. Favin Patent 3,157,798, which issued November 17, 1964. This transistor also has an emitter 16 connected to ground and a collector 17 connected through resistor 18 to one terminal of a secondary winding 19 of transformer 14 whose opposite terminal is connected to the positive terminal of a biasing battery 20 having a negative terminal at ground potential. Diode 21 is disposed in short circuit relation to the transformer secondary winding 19. Resistor 22 connects the positive terminal of the biasing battery to a junction point of the transformer primary winding and the transistor base. For the purpose of this illustration, the transistor is considered to be an N-P-N junction type.

In the initial operation of FIG. 1, its quiescent state assumes that no voltage is effective at the output of source E, and transistor Q1 is therefore in the nonconducting state. This permits direct current to flow in a series circuit including the positive terminal of the biasing battery, resistor 22, transformer primary winding 13, diode 12, resistors 10 and 11, voltage source E to ground, and back to the biasing battery. The voltage drop across resistors 10 and 11 and diode 12 applied to transistor base 15 is insufficient to drive the transistor into the conducting state. Resistor 22 limits the amount of direct-current flowing in the series circuit just traced and thereby the magnitude of the voltage developed across the series resistors 10 and 11 and diode 12 and applied to the transistor base.

Let it now be assumed that source E supplies a positive alternating voltage of increasing magnitude via resistors 10 and 11 to the cathode 12A of diode 12. In due course this voltage back-biases diode 12 to cut off conduction therethrough for permitting the magnitude of the voltage effective on the transistor base to rise via resistor 22 toward that of the biasing battery. As a consequence transistor Q1 is eventually rendered conductive to institute current flow in a series circuit including the positive terminal of the biasing battery, resistor 22, base-emitter junction of transistor Q1 to ground and back to the biasing battery. Current starts to flow in a circuit including the base-emitter junction of transistor Q1 to ground, diode 23 and the negative end of transformer primary winding 13. This initiates the regenerative feedback voltage effective at the transistor base by the transformer whose primary and secondary windings are electrically poled in opposite directions as indicated by the dots in FIG. 1.

This feedback voltage has such polarity as to render the transistor base more positive so that current is forced from the base into the emitter to ground and back through diode 23 to the negative end of the transformer primary winding. This action continues until the magnitude of the positive voltage of source E is so reduced that the voltage drop effected across the series resistors 10 and 11 and diode 12 in the circuit above traced and applied to the base of the transistor is insufficient to maintain conduction therein. Diode 21 serves to cut down on the overshoot as transistor Q1 terminates conduction. This blocking oscillator action is repeated so that output voltages of negative polarity and equal amplitude produced at collector terminal 26 are continuously transmitted through capacitor 24 to output terminals 25, 25. This voltage output may serve a useful purpose as hereinafter described in connection with FIG. 2, as one illustration.

Figure 2:
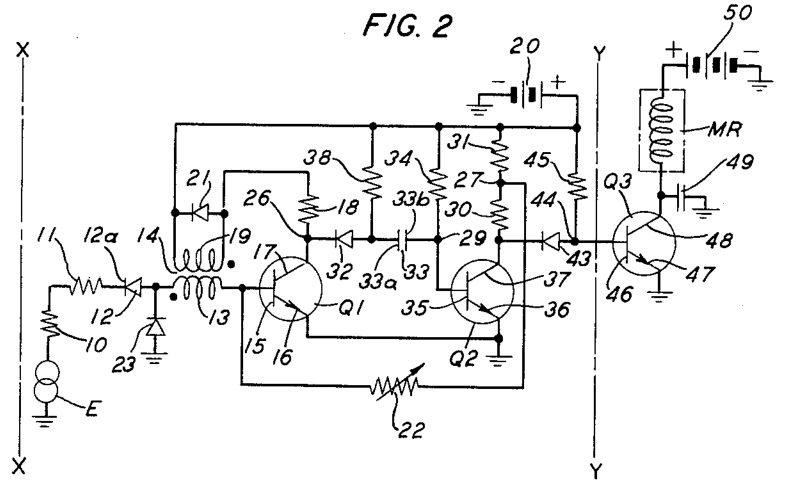
FIG. 2 is a schematic circuit showing a specific embodiment of the invention including FIG. 1.

In accordance with the present invention, the blocking oscillator including transistor Q1 as just described regarding FIG. 1 constitutes the first stage of a two-stage bistable trigged circuit which also includes transistor Q2 as shown in FIG. 2. In FIG. 2 the circuit involving transistor Q1 is essentially the same as that described above in regard to FIG. 1 except resistor 22 is adjustable and connects the junction point of the transformer primary winding and the base of transistor Q1 to one terminal of resistor 31 whose opposite terminal is connected to the positive terminal of the biasing battery in FIG. 2. Resistor 22 may be a fixed resistance if desired. The circuit of FIG. 2 also includes a transistor Q3 and a message register MR to count impulse noise voltages as disclosed in the above-identified patent of T. C. Anderson and D. L. Favin. This message register requires a finite time to operate and reset after recording each pulse provided in the output of transistor Q2 but tends to jam in response to subsequent pulses occurring during such finite time as hereinafter explained.

Referring to FIGS. 1 and 2 it is understood that identical elements shown therein have the same reference numerals. In FIG. 2, the collector output of transistor Q1 is connected via series diode 32 and capacitor 33 to a point 29 common to resistor 34 and base 35 of transistor Q2, which also includes an emitter 36 connected to ground, and a collector 37. Diole 32 is poled for conduction in the direction from capacitor 33 toward collector 17 of transistor Q1. Resistor 38 has one terminal connected to a junction point of diode 32 and capacitor 33. The other ends of resistors 31, 34 and 38 are connected to the positive terminal of the biasing battery. Resistor 30 is connected between collector 37 of transistor Q2 and point 27 common to resistors 22 and 31.

The collector output of transistor Q2 is connected by diode 43 to a point 44 common to resistor 45 and base 46 of transistor Q3 having an emitter 47 connected to ground, and a collector 48. The collector output of transistor Q3 is applied through a message register MR to the positive terminal of an operating battery 50. Capacitor 49 shunts to ground the leading edge of any high-frequency component in the collector output of transistor Q3. It is obvious that a magnetic core memory device, a stepping gas tube or the like could be readily substituted for the message register to count the noise impulses. The message register operates to record each peak noise impulse voltage in terms of each corresponding voltage pulse generated in the collector output of transistor Q2. Transistors Q2 and Q3 may be of a type identical with that of transistor Q1. Since one terminal of resistor 22 is connected to common point 27 of resistors 30 and 31 as previously noted, it is apparent that such one terminal of resistor 22 is returned to a positive potential as is the corresponding end of the same resistor in FIG. 1.

A familiar type of monostable trigger circuit is thus formed by blocking oscillator transistor Q1 and transistor Q2 and arranged so that collector 17 of transistor Q1 is connected via resistor 18 and transformer winding 19 to the positive terminal of the biasing battery 20 and via diode 32 and capacitor 33 to the base 35 of transistor Q2 while the emitters of both transistors Q1 and Q2 are connected to a common ground. The blocking oscillator Q1 is normally biased to nonconduction in a circuit that is presently traced. Transistor Q2 is normally conducting due to current flow from the positive terminal of the biasing battery 20 through resistor 34 to base 35 and is thereby driven into saturation. This enables current flow to continue from base 35 of transistor Q2 through its associated emitter to ground and back to biasing battery 20.

During the conduction of transistor Q2 and the nonconduction of transistor Q1, capacitor 33 is charged in a path including the positive terminal of biasing battery 20, resistor 38, capacitor 33, base-emitter junction of conducting transistor Q2 to ground and back to battery 20. As a consequence of such capacitor charge, plate 33*a* of capacitor 33 is provided with a voltage which is higher than that effective on its other plate 33*b*. In other words, the voltage of capacitor plate 33*b* is negative relative to that of its associated plate 33*a*. The voltages effective on the cathode and anode of diode 32 via resistors 18 and 38, respectively, are identical. As a consequence, diode 32 is biased slightly below its threshold of conductivity.

In the initial operation of the circuit shown in FIG. 2, its quiescent state assumes the absence of an alternating voltage at source E so that transistors Q1 and Q3 are in the nonconducting state and transistor Q2 is in a conducting state. This permits a direct current to flow from biasing battery 20 in a series circuit including the positive terminal of the latter battery, resistors 31 and 22, transformer primary winding 13, diode 12, resistors 10 and 11, source E to ground, and back to biasing battery 20. The positive voltage drop produced across series resistors 10 and 11 and diode 12 and applied to transistor base 15 holds transistor Q1 in the nonconducting state. Resistor 22 limits the amount of direct current flowing in the series circuit just traced and thereby the magnitude of the voltage developed across resistors 10 and 11 and diode 12 and applied to transistor base 15 for fixing the operating point of the blocking oscillator as above described.

Since transistor Q2 is conducting at the moment, current flows in a circuit including the positive terminal of battery 20, resistor 45, diode 43, collector to emitter of transistor Q2 to ground and back to biasing battery 20. The voltage produced across diode 43 and transistor Q2 in the circuit just traced and applied to base 46 of transistor Q3 is insufficient to turn ON the latter transistor. This enables the message register to remain in the unoperated state.

Let it now be assumed that source E applies a noise peak comprising a positive alternating voltage of increasing amplitude via resistors 10 and 11 to the cathode 12*a* of diode 12 in FIG. 2. This voltage in due course back-biases diode 12 to cut it OFF, as in FIG. 1, thereby enabling the positive voltage effective at transistor base 15 to rise in magnitude via resistors 22 and 31 toward that of biasing battery 20. As a consequence, transistor Q1 is eventually rendered conductive to institute current flow in a circuit including the positive terminal of biasing battery 20, resistors 31 and 22, base-emitter junction of transistor Q1 to ground and back to biasing battery 20. Current starts to flow in a circuit including the base-emitter junction of transistor Q1 to ground, diode 23 and back to the negative end of the transformer primary winding 13. This inititates the regenerative feedback voltage effected between transformer windings 13 and 19 as above noted whereby an increasing positive voltage is applied to transistor base 15 to provide a first negative going voltage pulse 55, shown, for example, in FIG. 3, at collector output terminal 26. This regenerative action serves to drive transistor Q1 harder into saturation.

This negative voltage pulse 55 is applied to the cathode of diode 32 which is thereby caused to transmit the latter pulse through capacitor 33 to base 35 of transistor Q2 which is thereby turned OFF. The magnitude of the voltage effective at common point 27 tends toward that of biasing battery 20 and thereby enables the collector current flow through transformer winding 19 and resistor 18 to hold transistor Q1 in the saturated state. Sufficient current is passed through resistor 22 for tending to turn ON diode 12 again. So long as source E supplies a positive voltage of adequate magnitude, such current exerts no effect on the base of transistor Q1 for the reason that it is already in the saturated state.

When transistor Q2 is turned OFF, the manitude of its collector voltage tends to rise. This voltage is applied via diode 43 to base 46 of transistor Q3 which is thereby turned ON. At this point the voltage effective on base 46 of transistor Q3 back-biases diode 43 which disconnects base 46 of transistor Q3 from collector 37 of transistor Q2. This enables current to flow in a circuit including the positive terminal of battery 20, resistor 45, base-emitter junction of conducting transistor Q3 to ground, and back to biasing battery 20. This current drives transistor Q3 hard into saturation to complete an operating circuit for message register MR via the positive terminal of battery 50, message register MR, conducting transistor Q3 to ground, and back to battery 50. The message register is operated to count the one positive pulse represented by the positive voltage produced at source E in terms of the corresponding voltage pulse produced in the collector circuit of Q2, as previously mentioned. The message register is held operated as long as transistor Q2 is turned OFF. The threshold of the operating circuit for the message register is rendered variable by appropriate adjustments of resistor 22, and has a hysteresis range of less than one millivolt.

Figure 3:
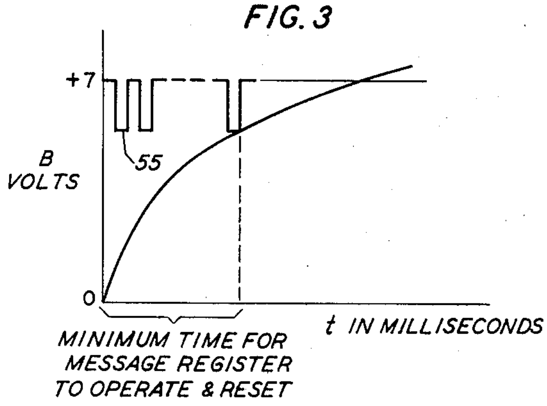
FIG. 3 is a curve representing action obtainable in FIGS. 2 and 4.

When the decreasing amplitude of the alternating voltage at source E falls below a certain value, the back-bias on diode 12 is removed to establish conduction therethrough. This enables current to flow from battery 20 through diode 12 in the circuit previously traced so as to bias base 15 of transistor Q1 to hold the latter in the nonconducting state as above mentioned. When another positive alternating voltage of increasing amplitude is supplied by source E to diode 12, the latter is again back-biased to nonconduction thereby enabling the positive voltage effective at base 15 of transistor Q1 to rise toward that of biasing battery 20. Again, transistor Q1 is rendered conductive to initiate the transformer regenerative feedback action whereby a second negative pulse 55 shown in FIG. 3 is produced at collector 26. This blocking oscillator action of transistor Q1 and transformer 14 continues in a similar manner to produce a given series of negative pulses 55 shown in FIG. 3 but only the first pulse 55 of such given pulse series reaches the base 35 of transistor Q2 for a reason that is presently explained.

Now capacitor 33 of a timing circuit including resistor 34 is charged in a path including the positive terminal of battery 20, resistor 34, capacitor 33, diode 32, conducting transistor Q1 to ground and back to battery 20. In due course the plates of capacitor 33 are charged with a voltage having polarities opposite to those effected thereon when this capacitor was charged through resistor 38 during the conduction of transistor Q2 as hereinbefore noted. In the new charge, plate 33*b* of capacitor 33 is provided with the higher or effective positive potential while its associated plate 33*a* has a lower or effective negative voltage relative thereto. As the voltage across capacitor 33 cannot change instantaneously and since, for example, a voltage of approximately +6.5 volts is effective thereacross, the base potential of transistor Q2 was approximately 6.0 volts below ground at the instant when it was rendered nonconductive.

As the new charge on capacitor 33 is rising in an exponential manner toward +7.0 volts as illustrated in FIG. 3, the voltage applied to base 35 of transistor Q2 is also supplied in a correspondingly exponential manner. This voltage rise continues until the positive voltage effective on plate 33*b* of capacitor 33 and applied to base 35 is of sufficient magnitude, say, for example, approximately +0.5 volts to re-establish conduction in transistor Q2. Capacitor 33 is now supplied with a charge of the order of 0.3 volt in such manner that its plate 33*b* is now more positive than its plate 33*a*; or in other words, the voltage on plate 33*a* is negative relative to that on plate 33*b*. This voltage is also effective at collector point 26 of transistor Q1 via diode 32, assuming no negative output pulse is effective at point 26. The establishment of conduction in transistor Q2 turns off conduction in transistor Q1. As a consequence, any negative output pulse effective at point 26 of the collector of transistor Q1 has, for example, a magnitude less than 7.0 volts. When a second negative pulse, for example, of the order of magnitude shown in FIG. 3 is produced at point 26, this voltage is precluded from reaching base 35 of transistor Q2 for the reason that diode 32 is held nonconductive by the reverse bias due to the exponentially increasing voltage charge on capacitor 33 to a magnitude equivalent to that of supply 20 as aforenoted. The negative voltage effective on plate 33*a* of charging capacitor 33 opposes any negative pulse produced at point 26 of collector 17 of transistor Q1 thereby precluding any further peak noise impulses at source E from turning OFF transistor Q2 at the moment. It is therefore apparent that when a first negative voltage pulse produced at point 26 of collector 17 of transistor Q1 and corresponding to a first peak noise impulse originating in source E is applied via diode 32 and capactor 33 to turn ON transistor Q2 as previously mentioned, this diode is biased with a negative voltage at capacitor plate 33*a* substantially immediately in the reverse direction in the manner just described. Diode 32 remains so biased for a time interval that is presently explained.

The time constant of timing resistor 38 and capacitor 33 is so chosen that succeeding peak noise impulses are prohibited from turning OFF transistor Q2 and turning ON transistor Q3 to operate the message register and thereby count the last-mentioned impulses and further so that diode 32 is back-biased to nonconduction until the message register has operated to effect such count and thereafter has reset to its normal state. This action of the message register obtains while the capacitor 33 is recharged via resistor 38 in the exponential manner shown in FIG. 3 until the charge on capacitor plate 33*a* applies a positive voltage to the anode of diode 32 whose associated cathode receives an equal positive voltage via resistor 18 and battery 20 whereby diode 32 is positively biased in opposite directions slightly below its threshold of conducton, in preparation for the recording of a succeeding peak noise impulse by the message register. During the time interval required for the charging of capacitor 33 in the path, including resistor 38 above traced, diode 43 disconnects effectively the collector of transistor Q2 from the base 46 of transistor Q3 for the reason discussed previously. Thus, the message register counts the number of peak noise impulses provided by source E and translated into other corresponding voltages in the output of transistor Q2 within a predetermined time interval. This interval may be fixed at one hour, more or less, as desired. Referring to FIG. 3, negative noise impulses 55 indicate the amplitude that would enable the message register to operate and reset itself within a minimum period of time, that is, within a finite time.

The time interval during which diode 43 disconnects collector 37 of transistor Q2 from base 46 of transistor Q3 enables the message register to operate and reset to its normal state. This time interval tends to compensate for the mechanical inertia of the message register required for its operation and reset to normal after recording each noise impulse. Thus the message register requires at least a minimum time to operate and reset for each count of one noise impulse but tends to jam when additional noise impulses occur within such minimum time. In other words, any additional noise impulses occurring within such minimum time are treated as if they do not exist and therefore are not recorded. The time constant of the timing circuit including resistors 34 and 38 and capacitor 33 is thus substantially equivalent to or slightly larger than the minimum operate-reset time of the message register. As a consequence, the message register counts only one pulse at least of a predetermined magnitude occurring in a given series at source E during each such minimum time, and any additional pulses occurring at source E during such time are lost insofar as a count thereof is concerned.

Figure 4:
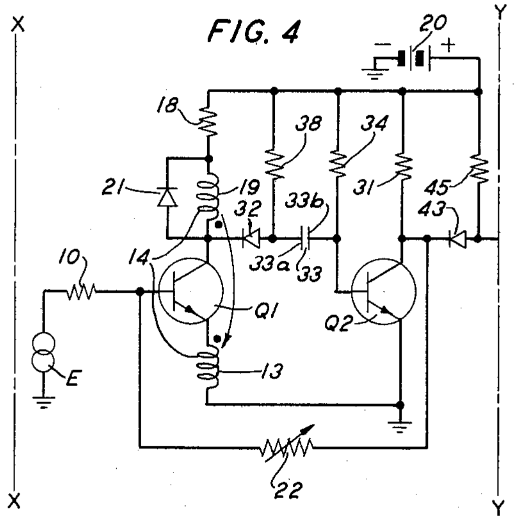
FIG. 4 is a schematic circuit delineating a second type of prior-art blocking oscillator useable in FIG. 2.

In a modification of the invention as shown in FIG. 4, it is understood that such modification may be substituted between the lines X—X and Y—Y in FIG. 2. The corresponding elements in FIGS. 2 and 4 are identified with the same reference numerals. In FIG. 4 a familiar type of prior-art blocking oscillator comprises transistor Q1 and feedback transformer 14 including primary winding 13 and secondary winding 19. Primary winding 13 is connected between the emitter of transistor Q1 and a common ground terminal which is also connected to the emitter of transistor Q2. The blocking oscillator Q1 constitutes the first stage of a two-stage monostable trigger circuit including transistor Q2. The operation of the blocking oscillator Q1 in FIG. 4 is essentially the same as that described above for the equivalent blocking oscillator Q1 shown in FIGS. 1 and 2.

In the quiescent operation of the circuit of FIG. 2 modified to include the circuit in FIG. 4, assuming the absence of a positive alternating voltage at source E, transistor Q2 in FIG. 4 is normally activated to the conductive state by a current flow due to a voltage developed across resistor 34 in a circuit including battery 20, resistor 34, base-emitter junction of transistor Q2 to ground and back to the battery. The voltage developed across resistor 34 drives transistor Q2 into saturation. During the conduction of transistor Q2, the positive voltages effective on the cathode and anode of diode 32 due to resistor 18 and the charge on capacitor plate 33*a*, respectively, are substantially identical thereby biasing the diode slightly below its threshold of conductivity as previously explained regarding the same diode in FIG. 2.

Current flows in a circuit including battery 20, resistors 31, 22 and 10, source E to ground and back to battery. The positive voltage developed across resistor 10 and applied to the base of transistor Q1 is insufficient to drive the latter into conduction because transistor Q2 is conducting at the moment. Resistor 22 fixes the operating point of the blocking oscillator Q1 in FIG. 4, and may or may not be adjustable, as desired.

Since transistor Q2 is conducting at this time, current flows in a circuit including battery 20, resistor 45, diode 43, collector and base-emitter junction of conducting transistor Q2 to ground and back to battery 20. The voltage produced across diode 43 and conducting transistor Q2 in the circuit just traced and applied to the base of transistor Q3 is inadequate to activate the latter into conduction. This permits the message register to remain in the unoperated condition.

Assume now a positive alternating voltage of increasing amplitude originating in source E is applied via resistor 10 to the base of transistor Q1 in FIG. 4. In due course, transistor Q1 is driven into conduction to establish current flow in a circuit comprising positive terminal of battery 20, resistors 31 and 22, base-emitter junction of conductive transistor Q1, transformer winding 13 to ground and returning to the negative terminal of the battery. At the same time current, due to the negative voltage pulse effective at the collector of transistor Q1, flows in a series circuit including transformer winding 19 and resistor 18 to the positive terminal of the battery. As transformer windings 13 and 19 are inductively coupled together, the negative voltage effective at the collector of transistor Q1 in FIG. 4 is regeneratively fed back to its emitter thereby driving the emitter more negative. This regeneration action serves to drive transistor Q1 harder into saturation.

Also the negative voltage pulse effective at the collector of transistor Q1 in FIG. 4 is applied to the cathode of diode 32 which is thereby caused to transmit the latter pulse through capacitor 33 to the base of conducting transistor Q2. This pulse turns off transistor Q2. This enables capacitor 33 to discharge in a circuit including its plate 33*a*, diode 32, collector and base-emitter junction of conducting transistor Q1 to ground, battery 20, and resistor 34 to plate 33*b* of capacitor 33. The magnitude of the voltage developed at the resistor 31 tends to rise toward the voltage of battery 20 thereby enabling the current flow in a circuit including battery 20, resistor 31 and resistor 22 to base of Q1 to hold transistor Q1 in the saturated state.

When transistor Q2 was turned off, the voltage generated in its collector circuit turned on transistor Q3 which provides a voltage pulse in its collector output to operate the message register in FIG. 2. This is thereby operated to count one voltage pulse originating in source E, in the manner hereinbefore described regarding FIG. 2. The message register is held operated so long as transistor Q2 is turned off.

Now capacitor 33 in FIG. 4 is charged in a circuit including the positive terminal of battery 20, resistor 34, capacitor 33, diode 32, conducting transistor Q1, transformer winding 13 to ground and back to the battery. This provides plates 33*a* and 33*b* of capacitor 33 with the voltages whose polarities are reversed relative to the polarities of the voltage placed thereon when capacitor 33 was charged through resistor 38 during the conduction of transistor Q2 as previously mentioned. The new voltage charge being placed on capacitor 33 continues until the positive voltage effective on plate 33*b* has sufficient magnitude to establish conduction in transistor Q2 while the negative voltage effective on plate 33*a* serves to reverse bias the anode of diode 32 which is thereby held nonconductive. This precludes any further peak noise voltage available at source E and translated into negative pulses 55 at the collector of transistor Q1 from turning off transistor Q2 in the manner hereinbefore described regarding FIG. 2. As a consequence, such further pulses effective at source E are not counted while transistor Q2 is turned off for the reason previously explained in regard to FIG. 3. The time constant of the timing circuit including capacitor 33 and resistors 34 and 38 is substantially equal to the minimum time involved in the operation of the message register to count one noise impulse and thereafter to reset itself in preparation to count another noise pulse. As previously indicated, any additional noise impulses occurring within such minimum time are not counted, and they are therefore "lost" to the overall count.

While all transistors are shown as the N-P-N junction type, it is obvious that transistors of any suitable type having characteristics similar to those of the above noted junction transistor may also be used. This includes P-N-P transistors which may be used by merely reversing the diodes and the polarity of the biasing battery.

It is understood that the above-described embodiments are merely illustrative of the application of the invention. Numerous other embodiments may occur to those skilled in the art without departing from the spirit and scope of the invention.

What is claimed is:

1. A pulse counting circuit comprising in combination a pulse generator including a blocking oscillator having input and output circuits, a transistor having input and output circuits, said oscillator and transistor having said input circuits connected to a common terminal, and means interconnecting said oscillator and transistor input and output circuits to bias said transistor conductive and said oscillator nonconductive, a source providing pulses to render said oscillator conductive and said transistor nonconductive for providing a corresponding pulse in said transistor output circuit, means to count the corresponding pulses provided in said transistor output circuit, said counting means requiring a finite time to operate in response to each counted pulse and to reset to normal thereafter but tending to be provided with additional corresponding pulses from said transistor output circuit during said finite time, and timing means included in said interconnecting means to effectively disconnect said oscillator output circuit from said transistor input circuit for a time interval substantially equivalent to said finite time thereby preventing said transistor output from providing said additional pulses to said counting means during said finite time.

2. The counting circuit according to claim 1 in which said interconnecting means includes a resistor having one terminal connected to said output circuit of said transistor and an opposite terminal to said oscillator input circuit.

3. A pulse counting circuit comprising in combination a pulse generator including a blocking oscillator having input and output circuits, a transistor having input and output circuits, said oscillator and transistor having said input circuits connected to a common terminal, and means interconnecting said oscillator and transistor input and output circuits to bias said transistor conductive and said oscillator nonconductive, a source providing pulses to render said oscillator conductive and said transistor nonconductive for providing a corresponding pulse in said transistor output circuit, a load connected to said transistor output circuit responsive to said pulses in said transistor output circuit, said interconnecting means including a timing means having a finite timing interval and comprising a timing capacitor, a biasing means, and a unidirectional conductive device connected in series with said capacitor between said transistor input circuit and said oscillator output circuit, said device poled for conduction in the direction toward said oscillator output circuit, said biasing means biasing said device slightly below its threshold of conduction when said oscillator is nonconductive, said capacitor charged to a predetermined magnitude during the conduction of said oscillator for reverse biasing said device and thereby effectively disconnecting said oscillator output circuit from said transistor input circuit to prevent said transistor from again being rendered conductive during the timing interval of said timing means.

4. The counting circuit according to claim 3 in which said biasing means includes a supply of direct-current voltage having a positive terminal and a negative terminal which is grounded, a first resistor having one terminal connected to said supply positive terminal and an opposite terminal to another terminal common to a first plate of said capacitor and said transistor input circuit, a second resistor having one terminal connected to said supply positive terminal and an opposite terminal to a further terminal common to a second plate of said capacitor and said unidirectional device, and a third resistor having one terminal connected to said output circuit of said transistor and an opposite terminal to said oscillator input circuit.

5. A pulse counting circuiting comprising in combination a pulse generator including a blocking oscillator having input and output circuits comprising a feedback transformer having a first winding connected in said input circuit and a second winding connected in said output circuit, a voltage source having a first and second terminal, a first terminal of said source connected to a circuit common point, a first resistor connected between said second terminal of said voltage source and said second winding of said feedback transformer, a first and second transistor having input and output circuits, a means interconnecting said oscillator and said first transistor input and output circuits to bias said first transistor conductive and said oscillator nonconductive, said interconnecting means including a timing means having a finite timing interval and comprising a timing capacitor, a first unidirectional conductive device connected in series with said capacitor between said first transistor input circuit and said oscillator output circuit, said device poled for conduction in the direction toward said oscillator output circuit, a second resistor having one terminal connected to said second terminal of said voltage source and an opposite terminal to another terminal common to a first plate of said capacitor and said first transistor input circuit, a third resistor having one terminal connected to said second terminal of said voltage source and an opposite terminal to a further terminal common to a second plate of said capacitor and said first unidirectional device, a fourth resistor having one terminal connected to said output circuit of said first transistor and an opposite terminal to said oscillator input circuit, said first unidirectional device biased slightly below its threshold of conduction when said oscillator is nonconductive, said capacitor charged to a predetermined magnitude during the conduction of said oscillator for reverse biasing said device, and thereby effectively disconnecting said oscillator output circuit from said first transistor input circuit to prevent said first transistor from again being rendered conductive during the timing interval of said timing means, a second unidirectional device connecting said first transistor output circuit with said second transistor input circuit, said second device poled for conduction in the direction toward said first transistor output circuit, a fifth resistor having one terminal connected to said second terminal of said voltage source and an opposite terminal to a point common to said second device and said second transistor input circuit, a source providing pulses to render said oscillator conductive and said first transistor nonconductive for providing a corresponding pulse in said second transistor output circuit, and a load connected to said second transistor output circuit responsive to said pulse in said second transistor output circuit.

6. A pulse counting circuit according to claim 5 in which said source generates pulses of at least a predetermined amplitude, said load comprising a device for counting other pulses produced at the output circuit of said second transistor and generated in response to said source pulses, said counting device requiring a finite time to operate and reset to count each of said other pulses, but tending to jam in response to additional other pulses generated within said finite time, said finite timing interval of said timing means being at least equal to said finite operate and reset time of said counting device, thereby preventing the application of additional pulses to said counting means during said finite operate and reset time, said first and second transistors having emitters, bases, and collectors, said emitters being connected to a circuit common point, said base of said first transistor being connected to the junction point of said second resistor and said capacitor, a sixth and seventh resistor serially connected between said collector of said first transistor and said second terminal of said voltage source, said fourth resistor connected to the junction point of said sixth and said seventh resistors in said first transistor output circuit, said base of said second transistor being connected to the junction point of said fifth resistor and said second unidirectional device, said collector of said second transistor connected through said counting means to said second terminal of said voltage source, and said input circuits of said pulsing source and said blocking oscillator being connected to a circuit common point.

References Cited by the Examiner

UNITED STATES PATENTS

| | | | |
|---|---|---|---|
| 3,014,138 | 12/1961 | Moore et a. | 307—88.5 |
| 3,040,185 | 6/1962 | Horton | 307—88.5 |
| 3,157,798 | 11/1964 | Anderson et al. | 307—88.5 |

DAVID J. GALVIN, *Primary Examiner.*

ARTHUR GAUSS, *Examiner.*